United States Patent [19]

Monroe

[11] Patent Number: 5,733,029
[45] Date of Patent: Mar. 31, 1998

[54] FIBEROPTIC CONVERSION APPARATUS FOR USE WITH ILLUMINATED MEDICAL INSTRUMENTS

[75] Inventor: Richard A. Monroe, Liverpool, N.Y.

[73] Assignee: Welch Allyn, Inc., Skaneateles Falls, N.Y.

[21] Appl. No.: 532,270

[22] Filed: Sep. 22, 1995

[51] Int. Cl.⁶ .................................................. F21V 8/00
[52] U.S. Cl. .................. 362/32; 362/109; 362/187; 385/117; 600/200
[58] Field of Search .................. 385/76, 77, 116, 385/117, 139, 901, 902; 600/182, 199, 200, 223, 245; 362/32, 119, 120, 187, 188, 109

[56] References Cited

U.S. PATENT DOCUMENTS

| | | |
|---|---|---|
| 3,583,795 | 6/1971 | Heine ............................ 385/117 |
| 4,006,738 | 2/1977 | Moore et al. .................. 385/117 |
| 4,772,093 | 9/1988 | Abele et al. .................. 385/119 |
| 4,870,952 | 10/1989 | Martinez ........................ 362/32 |
| 4,986,622 | 1/1991 | Martinez ........................ 385/16 |
| 5,005,943 | 4/1991 | Fort ............................... 385/117 |
| 5,101,468 | 3/1992 | Chiu .............................. 385/115 |
| 5,193,135 | 3/1993 | Miyagi ........................... 385/117 |

*Primary Examiner*—Alan Cariaso
*Attorney, Agent, or Firm*—Wall Marjama & Bilinski

[57] ABSTRACT

An illumination apparatus for illuminating a medical diagnostic instrument with a light source that is located remotely from the instrument and that is equipped with a fiberoptic cable having a threaded connector. The instrument to be illuminated includes a light cavity designed to receive an electrically powered light source. The illumination apparatus includes an adapter having a first coupling structure for engaging said threaded connector and a second coupling structure for engaging the instrument in proximity to said light cavity. When so engaged, the apparatus fiberoptically illuminates the light cavity in place of said light source.

23 Claims, 4 Drawing Sheets

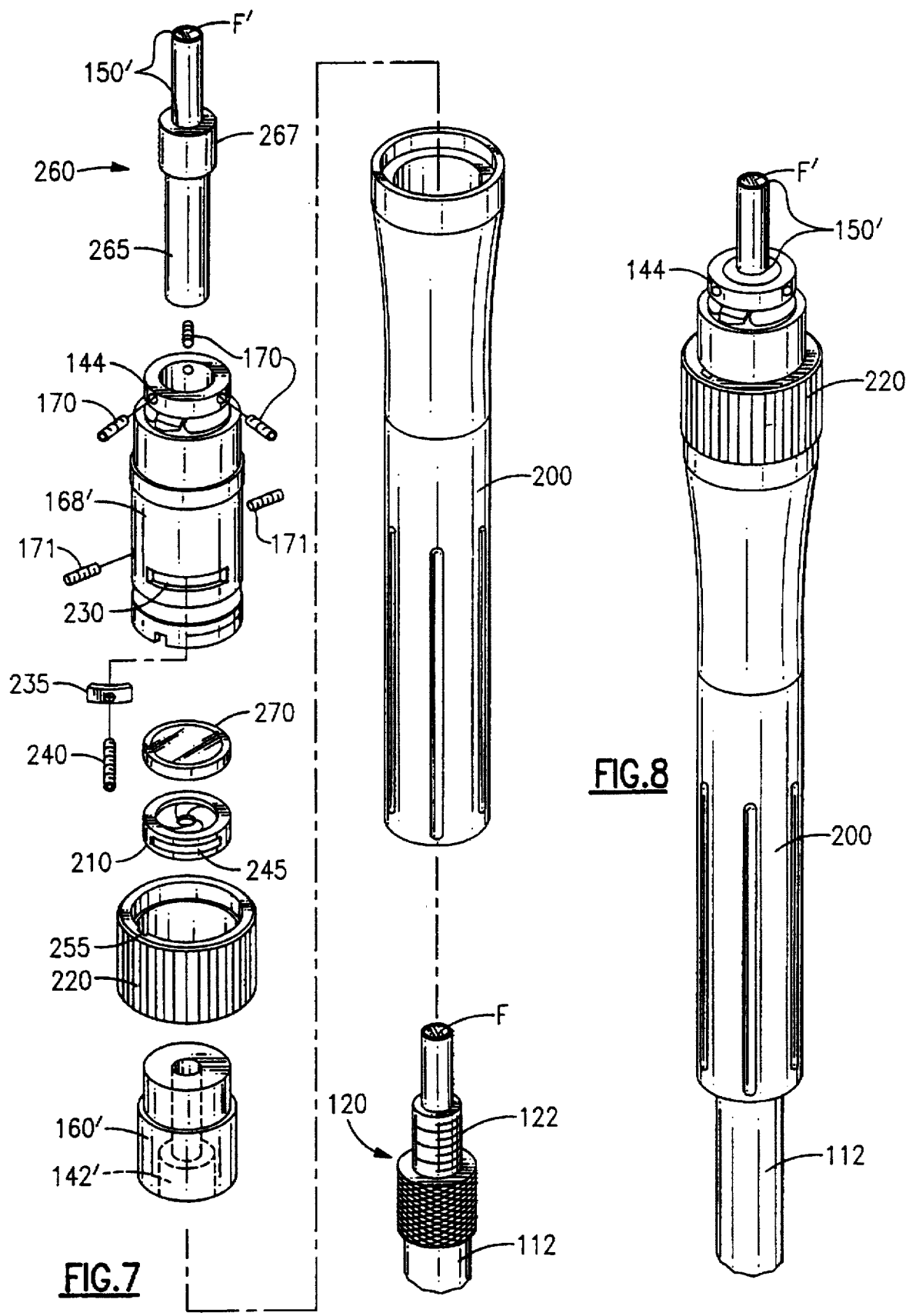

FIBEROPTIC CONVERSION APPARATUS FOR USE WITH ILLUMINATED MEDICAL INSTRUMENTS

BACKGROUND OF THE INVENTION

The present invention relates to illumination devices for use with illuminated medical instruments, and is directed more particularly to a fiberoptic illumination apparatus for reversibly converting lamp illuminated medical instruments to fiberoptically illuminated medical instruments.

Many types of medical diagnostic instruments, such as otoscopes, episcopes and ophthalmoscopes, are equipped with light sources for generating the light necessary to illuminate an area or organ of interest. These light sources typically comprise electrically powered lamps which are mounted in a cavity or receptacle formed within the body of the instrument and which are coupled to the light outlet of the instrument by a internally disposed fiberoptic bundle. This bundle typically includes optical fibers having proximal or input ends that are gathered into a circular end face at the outlet end of the lamp cavity, and having distal or output ends that are gathered into a ring-shaped end face at the light outlet of the instrument.

In order to assure than the colors of the area being examined are not distorted, the lamps used to illuminate them typically comprise halogen or arc lamps. Such lamps produce light which is not only bright, but which is also relatively white, i.e., has a spectral composition similar to sunlight. The generation of light of this type necessarily requires that the lamp operate at relatively high temperatures, such as 550 degrees Fahrenheit. These high temperatures, in turn, causes the temperature of the instrument with which they are used to become uncomfortably, or even injuriously high, particularly during prolonged periods of continuous use.

In order to overcome the above-discussed problem, instruments have been designed to be used with light sources which are located in an enclosure (commonly known as a light box) that is not in thermal proximity to the instrument. These remotely located light sources are then coupled to the instrument via a fiberoptic cable having a connector which is designed to engage a matching fiberoptic cable connector that is built into the instrument. Examples of instruments and illumination systems of this type are described in U.S. Pat. Nos. 4,772,093 (Abele et al.), 4,986,622 (Martinez), and 5,101,468 (Chiu).

While fiberoptic illumination systems are able to prevent the overheating of the instruments with which they are used, they have certain disadvantages which limit their usefulness. One of these is that the light sources used therewith cannot be easily changed, as they can be in lamp illuminated instruments, to change the spectral composition of the light provided thereby. With fiberoptically illuminated instruments, changing the light source requires that the associated light box be opened to provide access to the lamp.

Another undesirable feature of fiberoptic illumination systems is that they divide instruments into two types or families, one type being lamp illuminated and the other being fiberoptically illuminated. This, in turn, requires either the use of duplicate sets of instruments or a selection of one type or the other.

Thus, prior to the present invention, there has existed a need for establishing compatibility and interchangeability between lamp and fiberoptically illuminated instruments.

SUMMARY OF THE INVENTION

In accordance with the present invention, there is provided an illumination apparatus which allows lamp illuminated instruments to be easily and quickly converted for use as fiberoptically illuminated instruments, and back again. Significantly, this conversion may be accomplished quickly and easily without modifying the structure of the instrument, and without the use of any tools. Thus, the present invention eliminates the need for duplicate sets of instruments.

In its simplest form, the apparatus of the invention comprises an adapter or adapter assembly which includes two coupling structures that are maintained in a predetermined spatial relationship to one another. A first of these coupling structures comprises a receptacle which is shaped to engage (i.e., to receive and become secured to) the end connector of a fiberoptic cable. A second of these coupling structures comprises a receptacle which is shaped to engage the fitting through which electrical power is supplied to the lamp of a lamp illuminated instrument. Joining these coupling structures is a single or multi-piece structure which maintains the latter in a spatial relationship which assures that the tip of the fiberoptic cable (or an extension thereof) is able to function as a direct physical replacement for the lamp. As a result, when the lamp is removed from the instrument, the illumination apparatus of the invention may be coupled to the instrument in a way that allows the instrument to be used as if it had been designed for fiberoptic illumination.

The above-described convertability and interchangeability results from the fact that the adapter has a size and shape such that, when the adapter, the fiberoptic cable connector and the instrument power fitting are all engaged with one another, the tip of the fiberoptic cable projects into the light cavity of the instrument in place of the lamp. The depth of this projection is determined by the dimensions of the adapter end is selected so that the ends of the fiberoptic fibers are positioned approximately at the point where the filament or arc of the lamp had been located. As a result, the internal fiberoptic bundle of the instrument receives light from the same place and with approximately the same field of view as was provided by the lamp. This, in turn, assures that the instrument has similar illumination properties in spite of its having been converted for use with a fiberoptic source.

In a preferred embodiment, the adapter of the invention and the associated fiberoptic cable connector may be enclosed by a handle having a size, shape and appearance similar to that used with lamp illuminated instruments. When used with such a handle, the apparatus of the invention not only illuminates the instrument as well as an electrically powered lamp, it also has the same appearance and "feel" as instruments that use such lamps. Thus, the apparatus of the present invention is not only optically and functionally compatible with lamp illuminated instruments, it is aesthetically and ergonomically compatible as well.

In still another embodiment, the invention is equipped with a light adjusting assembly that allows a user to adjust the quantity of light transmitted to the instrument. If a handle of the above-mentioned type is used, this light adjusting assembly may be mounted within the handle and adjusted by means of a manually operated knob mounted thereon. With this embodiment, a user has the option of adjusting the quantity of light supplied to the instrument either at the instrument end of the fiberoptic cable or at the light box end thereof.

DESCRIPTION OF THE DRAWINGS

Other objects and advantages of the invention will be apparent from the following description and drawings, in which:

FIGS. 7 and 8 comprise respective exploded and assembly views of an embodiment of the invention that includes a light adjusting assembly.

DETAILED DESCRIPTION OF THE PREFERRED EMBODIMENTS

Figures 1, 2:
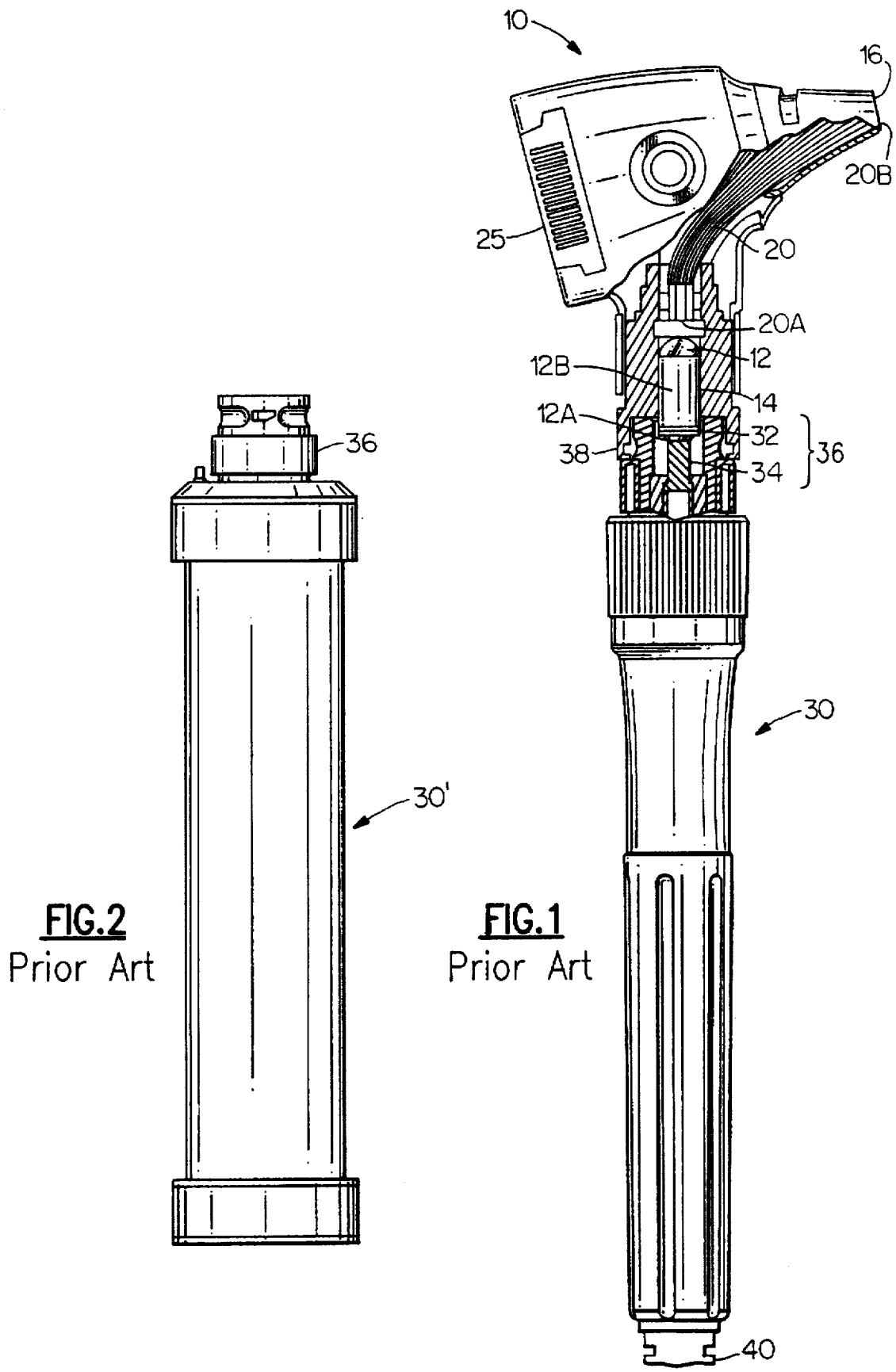
FIG. 1 is a partly cutaway view of a prior art lamp illuminated otoscope, together with a cord-equipped handle for supplying electrical power thereto.
FIG. 2 is a side view of a battery-equipped handle suitable for use in supplying electrical power to a lamp illuminated otoscope of the type shown in FIG. 1.

Referring to FIG. 1 there is shown a prior art otoscope 10 which is adapted to be illuminated by an electrically powered lamp 12 that is mounted within a light cavity or receptacle 14 formed within the body thereof. Light generated by lamp 12 is transmitted to the distal or outlet end 16 of otoscope 10 via an internally disposed fiberoptic bundle 20 which extends between light cavity 14 and end 16. The proximal end 20A of light bundle 20 is formed into a generally circular end face which is positioned in proximity to lamp 12 to receive light emitted thereby. This light is transmitted to distal end 20B of bundle 20 which is preferably formed into a ring (not shown). This ring surrounds a central opening through which an observer may make observations through an eyepiece (not shown) mounted in a removable insert 25.

Lamp 12 is designed to be powered by electrical current supplied thereto through an instrument support handle 30. This current is supplied to lamp 12 through a pair of connectors 32 and 34 that form the outer and inner portions, respectively, of a male bayonet type connector 36 of the type most clearly shown in FIG. 2. This connector is adapted to engage a female bayonet type connector fitting 38 formed at the base of instrument 10. When so engaged, inner conductor 34 of connector 36 makes contact with a first lead 12A of lamp 12 while outer conductor 32 makes contact with a second lead thereof, through a metal jacket 12B and the metal housing of the instrument. Lamp 12 is normally designed and mounted so that it remains within cavity 14 when handle 30 is disengaged from instrument 10.

Lamp illuminated instruments which require high light levels are ordinarily powered by a support handle such as 30 which is connected to an external power source through an electric power cable 40. Instruments which do not require such high light levels may be powered by a battery powered support handle 30' such as that shown in FIG. 2. Since the structure and operation of both of these types of support handles is well known to those skilled in the art, they will not be described in detail herein.

Figure 3:
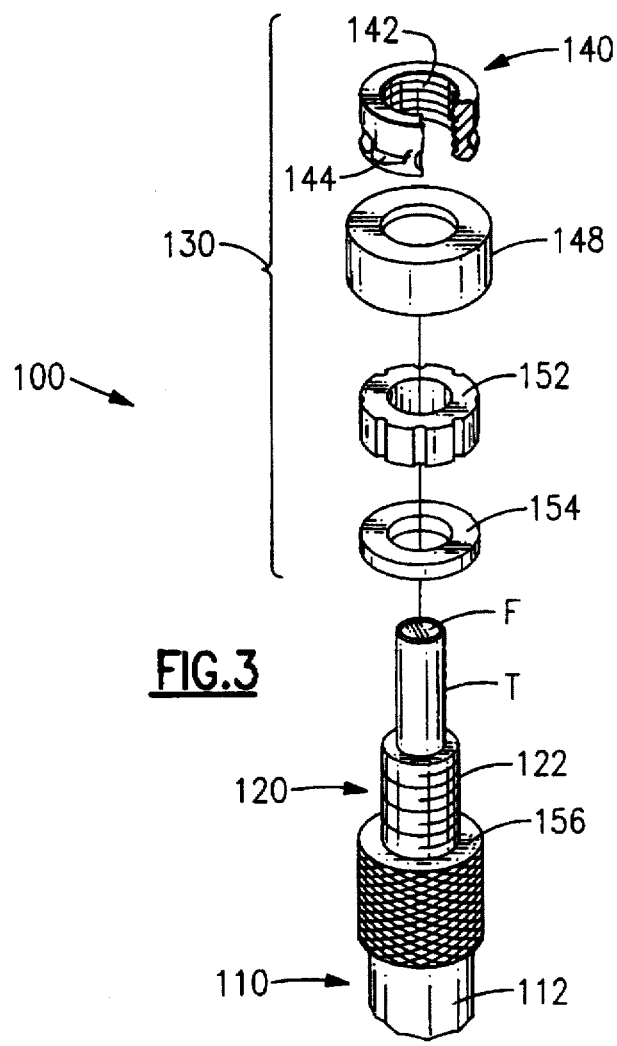
FIGS. 3 and 4 are respective exploded and assembly views of one embodiment of the present invention.
Figure 4:
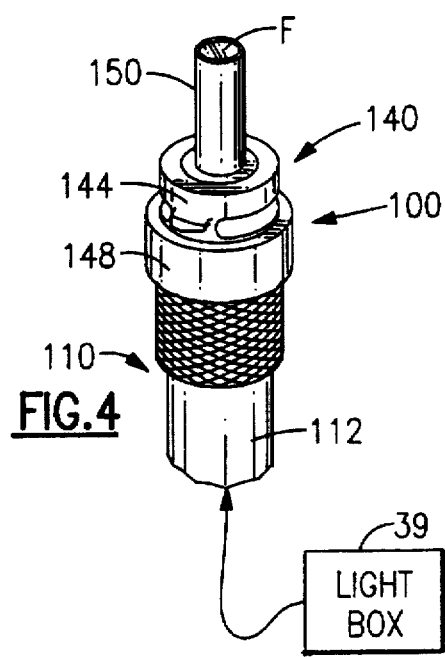

Referring to FIGS. 3 and 4 there are shown respective exploded and assembled views of the simplest embodiment of an illumination apparatus 100 constructed in accordance with the present invention. As is most clearly shown in FIG. 3, apparatus 100 includes a conventional fiberoptic cable 110 extending from an external light source 39, FIG. 4 which is terminated by a conventional fiberoptic connector 120.

Apparatus 100 also includes an adapter assembly 130 which, when assembled with connector 120, takes the form shown in FIG. 4. As will be explained more fully later, this form makes the apparatus physically and functionally interchangeable with support handle 30 and the lamp powered thereby. As a result, an instrument originally designed to be illuminated by a lamp can be quickly and easily converted for use with fiberoptic illumination systems and back again, as required.

Figure 6:
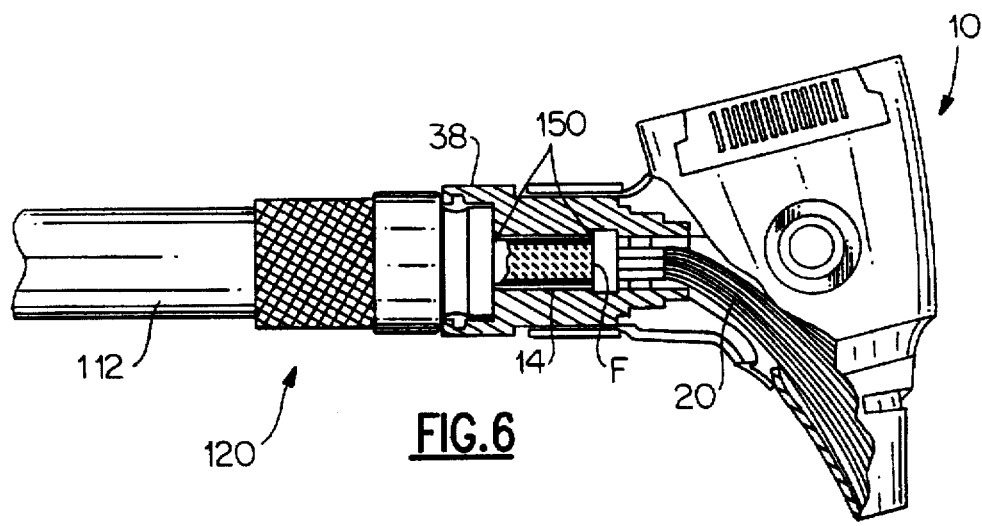
FIG. 6 is a fragmentary, partly cutaway assembly view of an otoscope that includes an illuminating apparatus constructed in accordance with the invention.

The interchangeability contemplated by the present invention is a function of the structural and spatial relationships among and between the constituent parts of adapter assembly 130. In the embodiment of FIGS. 3 and 4, adapter assembly 130 includes an adapter member 140 having a first coupling structure, here shown as a threaded interior surface 142, able to engage the threaded portion 122 of fiberoptic connector 120, and a second coupling structure, here shown as a outer surface 144, able to engage bayonet type connector fitting 38 of instrument 10. In accordance with an important feature of the invention, the axial dimensions of adapter 140 and/or the spacer element 148 used therewith are selected so that, when these elements are secured to connector 120, the portion 150 of cable tip T that extends beyond adapter 140 fits in the desired position within light cavity 14 of instrument 10, as shown in FIG. 6. As shown in the latter figure, this position is such that the end face F of the fiber bundle of cable 120 is located at approximately the position which had been occupied by the filament or other light emitting region of lamp 12. With end face F in the latter position, internal fiber bundle 20 of instrument 10 is able to receive light in substantially the same way that it did from lamp 12. Thus, originally lamp illuminated instrument 10 is effectively converted into a fiberoptically illuminated instrument with similar properties.

In the preferred embodiment of the embodiment of FIGS. 3 and 4, an elastomeric ring 152 is positioned inside of spacer 148, and a washer 154 is positioned between ring 152 and the shoulder 156 on the base portion of connector 120. The presence of elements 152 and 154 serves to compressibly tighten the fully assembled apparatus and prevent it from becoming loosened by the vibrations incident to its use and handling. These elements will be understood, however, not to constitute an essential part of the present invention.

Similarly, spacer 148 need not take the form of an element which is separate and distinct from adapter member 140. This is because the important thing about adapter assembly 130 is its ability to hold connector structures 142 and 144 in a predetermined position with respect to one another, and with respect to tip T, said position being such as to cause the apparatus to have a projecting fiberoptic tip portion 150 of the desired length. It will, therefore, be understood that the results contemplated by the invention can be achieved without regard to whether single or multiple elements are included within adapter assembly 130.

Figure 5:
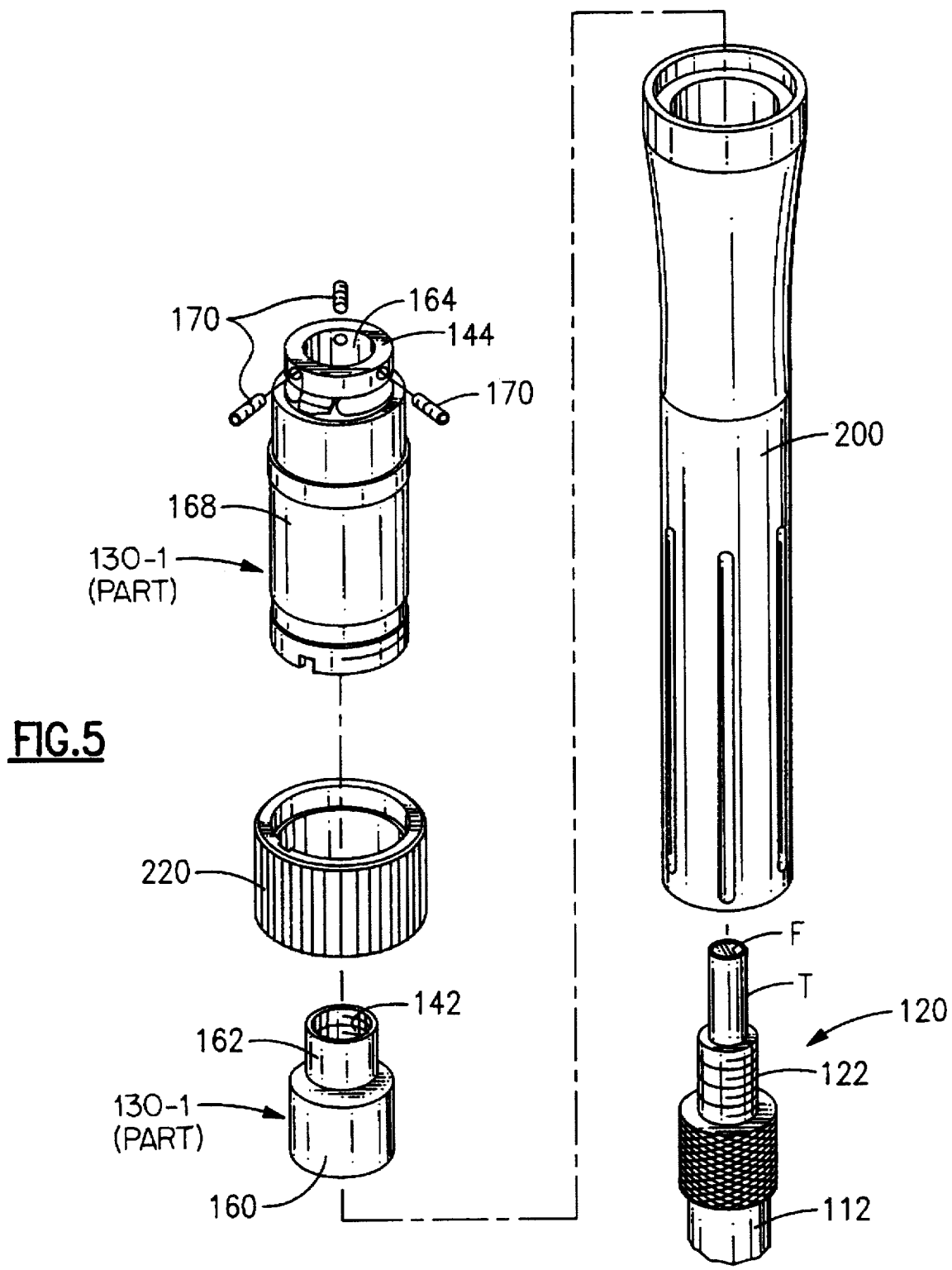
FIG. 5 is an exploded view of an apparatus of the type shown in FIGS. 3 and 4 which has been equipped with a mounting handle.

Referring to FIG. 5 there is shown an exploded view of an embodiment of the invention which is equipped with a handle 200 that endows the apparatus of the invention with a look and "feel" which is similar to that provided by the prior art devices shown in FIGS. 1 and 2. In the embodiment of FIG. 5 this is accomplished by providing the apparatus of the invention with a handle similar to that used by the prior art, and by using an adapter assembly 130-1 having a size and shape which allows fiberoptic connector 120 to be securely mounted therein while providing a projecting tip portion 150 of the desired length. The overall appearance of a fully assembled embodiment of this type is substantially as shown in FIG. 8.

If the presence of handle 200 is disregarded, the adapter assembly of the embodiment of FIG. 5 is generally similar to that described in connection with FIGS. 3 and 4, except in one respect. This is that, in the embodiment of FIG. 5, first and second coupling structures 142 and 144 are located on first and second coupling members 160 and 168, respectively, which are initially separate, but which are later joined together and held in the desired positions with respect to one another to form adapter assembly 130-1. More particularly, the tip portion 162 of first coupling member 160 may be secured within an opening 164 of second coupling member 168 by means of suitable set screws 170. Once this has been done, and assembly 130-1 has been secured in place within handle 200, the handle-adapter assembly may be threaded onto threads 122 of connector 120 to produce an illuminating apparatus having the overall appearance shown in FIG. 8. It will therefore be seen that the handle assembly may be attached to and detached from connector 120 as necessary to allow the handle assembly to be used with difference cables or to allow the cable to be used with different handle assemblies. If desired, the handle assembly of FIG. 5 may be provided with a knob 220 which is non-functional and merely resembles the knob shown in FIG. 1, or which is functional, as will be described in connection with FIGS. 7 and 8. Because the structural particulars of this and other features of the apparatus of FIG. 5 will be apparent to those skilled in the art, these particulars will not be described in detail herein.

In addition to contributing desirable aesthetic and ergonomic qualities, the handle shown in FIG. 5 provides a convenient enclosure for mounting optical accessories for instrument 10. Referring to FIGS. 7 and 8, for example, there are shown respective exploded and assembly views of an embodiment of the invention which is generally similar to that of FIG. 5, except that it includes a light adjusting assembly 210 which takes the form of a conventional iris mechanism. This mechanism 210 may be conveniently controlled by a user by means of a rotatable knob 220 which is located near the end of handle 200, i.e., in proximity to instrument 10. With this embodiment, the iris mechanism may be conveniently mounted between elements 160' and 168' which generally correspond to elements 160 and 168 of the embodiment of FIG. 5, but which have been modified to accommodate the iris assembly and associated parts.

One such modification is the inclusion in element 160' of a first coupling structure 142 which receives the full length of and terminates end connector 120. This termination is necessary in order to permit iris mechanism 210 to be connected in optical series with and adjacent to end face F of connector 120. Another is the inclusion in element 168' of a circumferential slot 230 for receiving an arcuate stop member 235, for limiting the range of the opening and closing of the iris, and an associated set screw 240. The latter preferably extends outwardly through slot 245 in iris mechanism 210 to fit into a slot 255 within knob 220 and thereby serves as a linkage which converts knob motion to iris motion. In the embodiment of FIG. 7 iris mechanism 210 is secured in place within element 168' by suitable set screws 171.

The embodiment of FIGS. 7 and 8 also differs from that of FIG. 5 in that it includes a fiberoptic extension member 260 having an inner end 265 which extends into proximity with iris mechanism 210, an outer end 150' which is adapted to fit into the light cavity of the instrument in place of lamp 12 and a middle portion 267 which may be secured within member 168' by set screws 170. This fiberoptic extension thus serves to restore the light path between fiberoptic cable 120 and the light cavity of the instrument which was interrupted by the introduction of the above-discussed iris mechanism. It will therefore be seen that, by providing fiberoptic extensions with inner ends 265 having different respective lengths, other optical accessories such as infrared, ultraviolet or other filter elements (e.g. 270), polarizing elements, or the like, may be mounted in the optical path extending through handle 200 without affecting the ability of the apparatus of the invention to accomplish its main purpose. It will be understood that all such combinations of accessories are within the contemplation of the present invention.

In view of the foregoing, it will be seen that the illuminating apparatus of the invention combines an ability to easily and quickly convert lamp illuminated instruments to fiberoptically illuminated instruments and back again with an ability to introduce one or more optical accessories not usable in the original lamp illuminated instruments. Because of its being realizable in such a variety of different forms, the true spirit and scope of the invention should be determined only with reference to the appended claims.

What is claimed is:

1. An illuminating apparatus for use with medical diagnostic instruments of the type having a light cavity from which light may be directed to a target area external to the instrument and a connector fitting through which power may be supplied to a light source releasably retained within said light cavity, said light source being a powered lamp extending a predetermined distance into said light cavity, said apparatus including:

a fiberoptic cable including a bundle of light transmissive fibers surrounded by a flexible covering and an end connector having a base portion adapted to be secured to said flexible covering, said end connector having a tip portion enclosing at least a substantial fraction of said light transmissive fibers;

an adaptive member having a body portion, first engaging means located on one end of said body portion for engaging said connector fitting of said instrument, and second engaging means located on an opposite end of said body portion for engaging said fiberoptic cable; wherein said body portion is sized to retain to allow said tip portion to pass therethrough such that when said when said adaptive member is attached to said connector fitting and said fiberoptic cable that said tip portion extends said predetermined distance into said light cavity to allow replacement of said lamp.

2. The illumination apparatus of claim 1 in which said holding means comprises an adapter member, in which said first and second coupling structures comprise coupling structures formed at different locations on said adapter member, and in which said adapter member determines the distance that the tip portion of said fiberoptic connector extends into said light cavity.

3. The illumination apparatus of claim 1 in which said first and second coupling structures are formed in respective first and second coupling members, and in which said holding means comprises means for holding said first and second coupling members in contact with one another.

4. The illumination apparatus of claim 3 further including a fiberoptic extension member and means for connecting said fiberoptic extension member to said second coupling member, said extension member having a size and shape such that light may be received from the tip portion of said fiberoptic connector and transmitted to said light cavity.

5. The illumination apparatus of claim 4 further including a light adjusting assembly disposed between said first and second coupling members for controlling the amount of light transmitted from the tip portion of said fiberoptic connector to said extension member.

6. The illumination apparatus of claim 5 in which said light adjusting assembly comprises an iris assembly for controlling the area of a circular light transmitting opening approximately centered on the center of said extension member.

7. The illumination apparatus of claim 1 in which the fastening means of said fiberoptic connector comprises a male threaded coupling adjacent to said base portion and in which said first coupling structure comprises a female threaded coupling adapted to threadedly receive said male threaded coupling.

8. The illumination apparatus of claim 1 in which the connector fitting of said instrument is a first bayonet connector, and in which said second coupling structure comprises a second bayonet connector that is adapted to engage said first bayonet connector.

9. The illumination apparatus of claim 7 in which the connector fitting of said instrument is a first bayonet connector, and in which said second coupling structure comprises a second bayonet connector that is adapted to engage said first bayonet connector.

10. An adaptive apparatus for use with medical diagnostic instruments having a body portion including a light cavity from which light may be directed to a target area external to the instrument and a connector fitting adjacent said light cavity, through which electric power may be supplied to a lamp releasably positioned within said light cavity including, said adaptive apparatus including:

a light bundle having an end connector having coupling means and an extending tip portion;

a first coupling member having a first coupling structure adapted to engage said end connector of said light bundle;

a second coupling member having a second coupling member for engaging said connector fitting of said instrument; means for holding said first and second coupling members in a predetermined position with respect to one another a fiberoptic extension member extending through said second coupling member and positioned to receive light from said light bundle;

whereby, when said first and second coupling members are respectively engaged with said end connector and said connector fitting, said fiberoptic extension member projects into said light cavity to serve as a replacement for said lamp.

11. The illuminating apparatus of claim 10 further including a means for securing said first and second coupling members to one another.

12. The illuminating apparatus of claim 10 further including a housing surrounding said coupling members and defining a gripping handle for supporting said instrument.

13. The illuminating apparatus of claim 10 further including a light adjusting assembly positioned between said fiberoptic extension and said end connector for controlling the amount of light received by said instrument.

14. The illuminating apparatus of claim 12 further including a light adjusting assembly positioned between said first and second coupling members.

15. The illuminating apparatus of claim 14 further including a manually operable knob, supported on said handle, for controlling the adjusting action of said light adjusting assembly.

16. An adapter for selectively converting a medical diagnostic instrument, said medical diagnostic instrument including;

a body portion including a lamp cavity;

a lamp releasably attached to said body portion and positioned within said lamp cavity, said lamp being spaced a predetermined distance from light transmittance means contained within said body portion for transmitting light to a distal end thereof; and a handle portion releasably attachable to body portion, said handle portion having means for releasably engaging said body portion and including means for powering said lamp when said handle portion is attached, said releasable engaging means including a male connecting portion on one of said body portion and said handle portion for engaging with a female connecting portion on the other of said handle portion and said body portion, said lamp normally mounted so that said lamp remains within said cavity when said handle portion is disengaged with said body portion;

said adapter being releasably interchangeable with said handle portion, and having first coupling means for engaging the male or female connecting portion of said body portion and second coupling means for engaging an external cable extending from an external light source, said adapter further including means for holding said first and second coupling means in a predetermined position with respect to one another said external cable including a bundle of light emitting fibers terminating at a distal light transmitting end, wherein said external cable can be alternately substituted as a light source in place of said lamp, wherein respective attachment of said first and second coupling means to said body portion and said external cable positions the light transmitting end of said external cable at the predetermined distance from said light transmittance means contained within said body portion.

17. The illuminating apparatus of claim 16 in which said adapter includes a threaded coupling structure formed on a first surface thereof and a bayonet type coupling structure formed on a second surface thereof.

18. The illuminating apparatus of claim 16 further including a housing surrounding said adapter and connector and defining a gripping handle for supporting said instrument.

19. An illumination apparatus for illuminating medical diagnostic instruments with a light source enclosed in a light box that is located remotely from said diagnostic instrument and that is equipped with a fiberoptic cable having a bundle of light transmissive fibers surrounded by a flexible covering, said diagnostic instrument being of the type which includes a light cavity normally designed to receive an electrically powered lamp and a connector fitting through which electric power is selectively coupled to said lamp including, in combination:

a fiberoptic connector having a base portion adapted to be secured to said flexible covering, a tip portion enclosing at least a substantial fraction of said light transmissive fibers, and fastening means adjacent to said base portion;

a first coupling structure for engaging the fastening means of said fiberoptic connector;

a second coupling structure for engaging the connector fitting of said instrument; and means for holding said first and second coupling structures in a predetermined position with respect to one another;

whereby, when said first and second coupling structures are engaged with said fastening means and said connector fitting, respectively, said tip portion projects into said light cavity to serve as a replacement for said lamp, wherein said first and second coupling structures are formed in respective first and second coupling members, and in which said holding means comprises means for holding said first and second coupling members in contact with one another, said illumination apparatus further including:

a fiberoptic extension member;

means for connecting said fiberoptic extension member to said second coupling member, said extension member having a size and shape such that light may be received from the tip portion of said fiberoptic connector and transmitted to said light cavity; and a light adjusting assembly disposed between said first and second coupling members for controlling the amount of light transmitted from the tip portion of said fiberoptic connector to said extension member.

20. An illuminating apparatus as recited in claim 19, in which said light adjusting assembly comprises an iris assembly for controlling the area of a circular light transmitting opening approximately centered on the center of said extension member.

21. An illuminating apparatus for use with medical diagnostic instruments of the type having a light cavity from which light may be directed to a target area external to the instrument and a connector fitting through which electric power may be supplied to a light source positioned within said light cavity including, in combination:

a light bundle having an end connector suitable for use in coupling said light bundle to a light utilization device;

a first coupling member having a first coupling structure adapted to engage said end connector;

a second coupling member having a second coupling structure adapted to engage said connector fitting; means for holding said first and second coupling members in a predetermined position with respect to one another a fiberoptic extension member extending through said second coupling member and positioned to receive light from said light bundle;

whereby, when said first and second coupling members are engaged with said end connector and said connector fitting, said fiberoptic extension member projects into said light cavity to serve as a replacement for said lamp, said illuminating apparatus further including a light adjusting assembly positioned between said fiberoptic extension and said end connector for controlling the amount of light received by said instrument.

22. An illuminating apparatus as recited in claim 21, in which said light adjusting assembly comprises an iris assembly.

23. An illuminating apparatus as recited in claim 21, further including a manually operable knob, supported on said handle, for controlling the adjusting action of said light adjusting assembly.

\* \* \* \* \*